United States Patent [19]

Smith et al.

[11] 4,173,593
[45] Nov. 6, 1979

[54] METAL ACETYLACETONATE LATENT ACCELERATORS FOR AN EPOXY-STYRENE RESIN SYSTEM

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 784,752

[22] Filed: Apr. 5, 1977

[51] Int. Cl.² .............................................. C08L 63/00
[52] U.S. Cl. .................... 525/109; 525/122; 525/529; 336/96; 428/377; 428/418
[58] Field of Search ................ 260/837 R, 836, 78.41

[56] References Cited

U.S. PATENT DOCUMENTS

| | | | |
|---|---|---|---|
| 3,624,032 | 11/1971 | Miyashiro et al. | 260/47 EC |
| 3,919,348 | 11/1975 | Foster et al. | 260/837 R |
| 4,038,339 | 7/1977 | Foster | 260/835 |

Primary Examiner—Theodore E. Pertilla
Attorney, Agent, or Firm—D. P. Cillo

[57] ABSTRACT

An epoxy-styrene, solventless resin impregnating varnish, having an atmospheric catalyzed pot life at room temperature of at least 45 days, is made by mixing: (1) the product of the reaction of (a) 1 part of an epoxy resin mixture, comprising solid epoxy resin and liquid epoxy resin wherein the weight ratio of solid epoxy: liquid epoxy is between 1:1 to 1:10; with (b) between about 0.01 part to 0.06 part of maleic anhydride and (c) a catalyst under such conditions that the epoxy diester formed has an acid number of between about 0.5 to 3.0; with (2) a coreactive vinyl monomer; and between about 0.0003 part to 0.004 part of a room temperature stabilizer; (3) between about 0.3 part to 1.2 part of a polycarboxylic anhydride, which is soluble in the mixture of (1) and (2), and an amount of free radical catalyst that is effective to provide a catalytic effect on the impregnating varnish and to cure it at temperatures of over about 85° C., and with (4) between 0.0005 part to 0.005 part of a metal acetylacetonate, selected from the group consisting of chromium (III) acetylacetonate, manganese (III) acetylacetonate, ferric (iron III) acetylacetonate, zinc (II) acetylacetonate, aluminum (III) acetylacetonate, sodium (I) acetylacetonate, uranyl (VI) acetylacetonate, and mixtures thereof, acting as latent accelerator.

8 Claims, 7 Drawing Figures

METAL ACETYLACETONATE LATENT ACCELERATORS FOR AN EPOXY-STYRENE RESIN SYSTEM

BACKGROUND OF THE INVENTION

Foster et al., in U.S. Pat. No. 3,919,348, taught epoxy-styrene-anhydride resins useful for vacuum pressure impregnation of mica insulated motor and generator coils. These resins relied upon azo compounds and peroxide catalysts to cure the resin. These resins provided a low viscosity impregnant, with excellent electrical and storage properties, but required either a high temperature final cure at about 170° C., or a long, 16 hour final cure at about 150° C., in order to provide power factor values of about 10% to 13% at 150° C. The high temperature cure could cause mica delamination from copper conductors due to their difference in thermal expansion characteristics. A long, lower temperature cure, boosts energy requirements and slows the production shop schedule.

Markovitz, in U.S. Pat. No. 3,812,214, taught control of the curing rate of viscous epoxy resin systems, by using up to about 20 wt.% of a combination of a phenolic resin accelerator with a metal acetylacetonate acting as a catalytic hardener. Markovitz eliminated anhydride curing agents, and substitued the phenolic resin, and up to 5 wt.% of metal acetylacetonates. The useful acetylacetonates could contain essentially any metal anion. Naps, in U.S. Pat. No. 2,876,208, and Starck, in U.S. Pat. No. 2,801,228, used copper acetylacetone as a stabilizer for phenolic resins, and nickel acetylacetone as a hardener for epoxy resins, respectively.

Miyashiro, in U.S. Pat. No. 3,624,032, taught epoxy-anhydride, particulate transfer molding compositions for encapsulating electronic parts. These compositions contained selected metal acetylacetonates to promote reactivity and bring about a high quality cure at about 150° C. In the Mlyashiro system, the metal anion was selected from zinc, aluminum, iron, copper, cobalt, nickel, magnesium, zirconium and tin.

What is needed is a low viscosity, styrene containing impregnant, containing a compatible accelerator not reactive with the styrene, or peroxide or azo catalysts, which will provide good pot life, yet quick, low temperature cures, and resulting power factors of below about 15% at 150° C.

SUMMARY OF THE INVENTION

It has been found, that epoxy-styrene-anhydride resin impregnating varnish systems, having excellent impregnation, shelf life, curing, and electrical properties, and which are particularly suitable for coating and impregnating large motor and generator insulation, or other insulated electrical components, can be made. This is accomplished by conducting an essentially complete esterification reaction, between a liquid-solid epoxy resin mixture and maleic anhydride, in the presence of a catalyst such as piperidine, pyridine, an imidazole, or an aliphatic teritary amine; and then adding other ingredients such as sytrene, along with a room temperature stabilizer, a polycarboxylic anhydride, a peroxide or azo compound as a catalyst, and a critical amount of a selected metal acetylacetonate acting as a latent accelerator.

The method comprises reacting 1 part of an epoxy resin combination, consisting of a liquid epoxy resin having an epoxy equivalent weight of between about 100 to 385, and a solid epoxy resin having an epoxy equivalent weight of between about 390 to 2,500, wherein the weight ratio of solid epoxy: liquid epoxy is between about 1:1 to 1:10, with between about 0.01 part to 0.06 part of maleic anhydride in the presence of between about 0.0001 part to 0.005 part of a catalyst selected from the group consisting of piperidine, pyridine, imidazoles, and aliphatic tertiary amines, and mixtures thereof; under such conditions that the anhydride is effective to substantially completely react with the epoxy resin mixture, to form an epoxy diester having an acid number of between about 0.5 to 3.0.

Then, to the substantially completely esterified reaction product is added: a suitable coreactive vinyl monomer such as styrene, in an amount effective to impart a short gel time and low viscosity to the varnish; between about 0.0003 part to 0.004 part of a room temperature stabilizer, selected from the group consisting of aromatic quinones, and aromatic acidic nitrophenols, selected from the group consisting of dinitrophenols and trinitrophenols, and mixtures thereof; between about 0.3 part to 1.2 parts of a polycarboxylic anhydride, such as NADIC methyl anhydride, which is soluble in the sytrene-epoxy diester at temperatures between about 0° C. to 35° C.; an amount of peroxide and/or azo compound that is effective to provide a catalytic effect on the impregnating varnish at temperatures of over about 85° C.; and between 0.0005 part to 0.005 part of selected metal acetyl acetonates, which are non-ionic and non-reactive with styrene, selected from the group consisting of chromium (III) acetylacetonate, manganese (III) acetylacetonate, ferric (iron III) acetylacetonate, zinc (II) acetylacetonate, aluminum (III) acetylacetonate, sodium (I) acetylacetonate, uranyl (VI) acetylacetonate and their mixtures, acting as a latent accelerator.

The reaction of mixtures of epoxy resins, maleic anhydride and catalyst, is completed at temperatures of between about 80° C. to 100° C., to form a diester. The styrene and stabilizer are then added at temperatures of between about 50° C. to 90° C. This provides a mixture having a viscosity of between about 5 cps to 500 cps at 25° C. Then the polycarboxylic anhydride and peroxide or azo compound are dissolved in the mixture at temperatures between about 0° C. to 35° C., to provide the final impregnating varnish having a viscosity of between about 5 cps to 500 cps at 25° C. The selected acetylacetonate latent accelerator can be added last, or added with the styrene or the polycarboxylic anhydride.

This solventless resin system has superior properties, such as low viscosity at room temperature, adhesiveness, chemical inertness, an atmospheric pot life of at least 45 days at 25° C., and more importantly, fast cure at temperatures of about 150° C. to give good electrical properties. Upon cure, little pollution problems are encountered. These properties make this resin system especially suitable for coating, impregnating and encapsulating large electrical component insulation, such as mica insulated motor and generator coil insulation, by immersion in or vacuum impregnation of the composition. This operation would be commercially impractical if the large volume of impregnating varnish encapsulant did not have a pot life that would permit it to retain its low viscosity, and to be used repeatedly over a period of at least 45 days.

Because of the voltage stresses normally expected in high voltage mica insulated motor and generator coils, the electrical properties of the insulation, particularly at temperatures of about 150° C., become of paramount importance in the manufacture of the coils. In general, power factor (100×tan δ) values of less than 15% at 150° C. are desired in the ground wall insulation. We found that this requirement could be met, and the impregnant completely cured, in a fast, low temperature operation, by utilizing only certain metal acetylacetonates which were non-ionic, and apparently did not react with the highly reactive styrene component, which was necessary to provide good gel times and high fluidity. We also found that these selected metal acetylacetonates did not promote room temperature decomposition of the peroxide or azo catalysts. Many acetylacetonates, such as manganese (II), cobalt (II), cobalt (III), and titanium acetylacetonates, gave either poor gel times, poor storage stability, or high power factor and dielectric constant values.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

It has been found that selected metal acetylacetonates are effective latent accelerators for the anhydride cure of epoxy-styrene impregnating and coating compositions, used in impregnating and encapsulating the coils of high voltage capability electrical devices. At concentrations of 0.0005 part to 0.005 part of selected acetylacetonate per 1 part epoxy resin, rapid gel times in the temperature range of 125° C. to 150° C. are possible. The term "latent accelerator" is taken to mean the ability of certain selected metal acetylacetonates to speed up curing rates of epoxy-anhydride systems at elevated temperatures (e.g. over 100° C.), while exhibiting little or no cure at room temperature, thus giving good storage properties.

The useful metal acetylacetonates of the present invention can be characterized by the following structural formula:

$$M^{n+}(C_5H_7O_2)_n$$

where n is 1, 2, 3 or 6, corresponding to ionic charge on the metallic atom. M can be sodium (I), zinc (II), chromium (III), aluminum (III), manganese (III-manganic), ferric (iron III) and uranyl (VI). These selected acetylacetonates can be used alone or in mixtures. Chromium (III) acetylacetonate is preferred.

A great number of metal acetylacetonates are not useful in this low viscosity epoxy-styrene-anhydride system, providing either very poor power factor values and dielectric constants, long gel times, very poor solubility in the resinous system or poor storage stability. Included among the metal acetylacetonates giving poor results in the resin system are manganese (II) acetylacetonate, cobalt (II) acetylacetonate, cobalt (III) acetylacetonate and titanium acetylacetonate.

At this time, it is not clear why only certain of the metal acetylacetonates are such effective latent accelerators for epoxy-styrene-anhydride impregnating systems. It is believed that a complex or adduct forms between the anhydride and the metal anion of the acetylacetonate, to open the anhydride ring, producing a heat activated ionic species especially free to react with the epoxy. It is believed that the cure mechanism is not a catalytic cure, where large quantities of metal acetylacetonate can be used alone as the sole catalyst, but rather a type of metal acetylacetonate-epoxy or anhydride adduct formation, followed by proton transfer from the adduct to other epoxy or anhydride molecules.

It is thought that the presence of the styrene monomer, plus organic peroxide or azo compound, is an important factor why only certain acetylacetonates will work in this system. Compounds, such as manganese (II), cobalt (II) and cobalt (III) acetylacetonates, may induce styrene polymerization at room temperature. Conversely, for some reason not yet understood, the presence of styrene may give a stabilizing effect to compounds such as zinc (II), magnesium (III), ferric (III) and uranyl acetylacetonates, as compared to their behaviors in "straight" i.e., unmodified epoxy-anhydride or epoxy-phenolic resin systems.

The useful, selected metal acetylacetonates must be mixed in critical proportions with the epoxy-styrene-anhydride system. The useful weight percent range of selected metal acetylacetonate is from 0.0005 part to 0.005 part per 1 part of epoxy resin mixture, with a preferred weight percent range of from about 0.001 part to about 0.005 part per 1 part of epoxy resin mixture. Over 0.005 part of selected metal acetylacetonate per 1 part of epoxy causes loss of fluidity and reduction of pot life; under 0.0005 part of selected metal acetylacetonate causes excessively long gel times for high voltage coil applications.

One type of epoxy resin, which may be used in the invention, is obtainable by reacting epichlorohydrin with a dihydric phenol in an alkaline medium at about 50° C. using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

where n is an integer of the series 0, 1, 2, 3 . . . , and R represents the divalent hydrocarbon radical of the dihydric phenol. Typically R is:

to provide a diglycidyl ether of bisphenol A type epoxide or to provide a diglycidyl ether of bisphenol F type epoxide resin.

The bisphenol epoxides used in the invention have a 1, 2 epoxy equivalency greater than one. They will generally be diepoxides. By the epoxy equivalency, reference is made to the average number of 1,2-epoxy groups, contained in the average molecule of the glycidylether. Typically, epoxy resins of bisphenol are readily available in commercial quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula:

wherein n is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butyrlaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to *The Handbook of Epoxy Resins* for a complete description of the their synthesis. Other useful epoxy resins include glycidyl esters, hydantoin epoxy resins, cycloaliphatic epoxy resins and diglycidyl ethers of aliphatic diols.

The glycidyl ester epoxy resins which can be employed in this invention are non-glycidyl ether epoxides containing more than one 1,2-epoxy group per molecule. They are characterized by substitution of the ester bond, for the ether bond, —O—, and have the chemical structural formula:

where R is an organic radical substituent selected from the group consisting of R', R'—O—R', R'—COO—R' and mixtures thereof, where R' is selected from the group consisting of alkylene groups, having from about 1 to 8 carbon atoms, saturated cycloalkylene groups where the ring has 4 to 7 carbons and mixtures thereof, where n is from about 1 to 8.

The hydantoin epoxy resins which can be employed in this invention are based on hydantoin, a nitrogen-containing heterocyclic ring having the structure:

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

The cycloaliphatic type epoxides employed as the resin ingredient in the invention are selected from non-glycidyl ether epoxides containing more than one 1,2-epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH. These resins are well known in the art and reference may be made to Brydson, J., *Plastic Materials*, 1966, 471, for their synthesis and description.

Such non-glycidyl ether cycloaliphatic epoxides are here characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used is equivalent to the term "epoxy resin".

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl- 3,4-epoxy-6-methylcyclohexane carboxylate and dicyclopentadiene, having the following respective structures:

Other useful cycloaliphatic epoxides include 2-(3,4-cyclohexyl-5,5-spiro-3,4-epoxy)cyclohexane-metadioxane and 3,4-epoxy-6-methylcyclohexyl methyl adipate.

A distinguishing feature of many of the non-glycidyl ether cycloaliphatic epoxides is the location of the epoxy group(s) on a ring structure rather than on an aliphatic side chain. Generally, the cycloaliphatic epoxide particularly useful in this invention will have the formula selected from the group of:

where S stands for a saturated ring structure, R is selected from the group consisting of $CHOCH_2$, $O(CH_2)_nCHOCH_2$ and $OC(CH_3)_2CHOCH_2$ radicals where n = 1 to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

Examples of suitable acyclic aliphatic epoxides would include epoxidized diene polymers and epoxidized polyesters. Typical of the epoxidized diene polymers are products produced by treatment of a polyisoprene or polybutadiene resin with peracetic acid; for example:

(Epoxidized Polybutadiene)

where n = 25 to 250.

Suitable dienes would include those having from 4 to 15 carbon atoms per molecule and the resulting epoxidized diene polymers could have from 3 to 8 percent by weight oxirane (epoxy) oxygen content.

Synthetic polyesters, suitable for making epoxy esters, are derived from the reaction of organic polybasic acids or anhydrides with polyols such as primary diols, to provide a diester:

(Diol) (Acid) (Diester)

Either the acid or the polyol or both may contain the requisite unsaturation for R and R' in the formula above. Examples of suitable polyepoxides based on unsaturated polyesters would be those derived from oleic ($C_{18}H_{34}O_2$) or linoleic ($C_{18}H_{30}O_2$) unsaturated acids and ethylene glycol ($CH_2OH$—$CH_2OH$), glycerol ($CH_2OHCHOHCH_2OH$), and pentaerythritol $C(CH_2OH)_4$ and reacted with peracetic acid. Generally, R in the formula above can contain from 2 to 10 carbons and R' from 10 to 24 carbons.

The epoxidized diester will have the general formula where R can be $CH_2$, $C(CH_3)_2$, and $(CH_2)_n$, where n=2 to 10; R" can be H, $CH_3$, and $CH(CH_3)_2$ and OCOR' can be oleic, linoleic, gadoleic, palmitoleic and ricinoleic, with R' having 10 to 24 carbons, and a degree of unsaturation of 1 to 4 double bonds per OCOR' unit. R' could be represented as:

where n and m range from about 5 to 12. The epoxidized esters should have from about 4 to 7% by weight oxirane (epoxy) oxygen content.

A complete description of epoxidation of dienes, and synthetic glycidyl polyesters can be found in *The Handbook of Epoxy Resins*, by Lee and Neville, Chapter 3, pages 9-17, McGraw-Hill (1967), herein incorporated by reference.

All of these epoxy resins can be characterized by reference to their epoxy equivalent weight, which is defined as the mean molecular weight of the particular resin divided by the mean number of epoxy radicals per molecule. The bisphenol A and bisphenol F epoxy resins can be in solid or liquid form, and their epoxy equivalent weight can range from about 100 to 2,500. within this range there is a preferred range of from about 100 to 800. The epoxy resin mixture of this invention can comprise completely bisphenol A or bisphenol F types. Use of resins having epoxy equivalent weights over about 2,500 present blending problems and may result in impregnating problems. The novolac resins can be in liquid or solid form, and their epoxy equivalent weight can range from about 100 to 500. Within this range there is a preferred range of from about 100 to 385. They are particularly useful in admixture with the bisphenol A type epoxy resins in this invention. The glycidyl ester epoxy resins and the hydantoin epoxy resins can be in solid or liquid form and their epoxy equivalent weight can range from about 100 to 500.

In the present invention, the suitable non-glycidyl ether epoxides are characterized by an epoxy equivalent weight of from about 100 to 600 for the cycloaliphatic type, and from about 250 to 600 for the acyclic aliphatic type. Within this range there is a preferred range of epoxy equivalency of from about 125 to 450 for the cycloaliphatic type and from about 250 to 420 for the acyclic aliphatic type.

The solid epoxy resins used in this invention are preferred to be high purity materials, i.e., over about 99.5% free of residual reactive species such as amine catalysts or quaternary ammonium compounds used to upgrade or increase the molecular weight of the epoxy resins from the liquid to the solid state. Generally, the solid epoxy resins used in this invention will have an epoxy equivalent weight of between about 390 to 2,500 and the liquid epoxy resins used in this invention will have epoxy equivalent weight of between about 100 to 385.

With any of the epoxy resins used, if the ratio of solid epoxy: liquid epoxy is less than 1:1, the epoxy resins will be difficult to blend; if the ratio is greater than 1:10, i.e., excess liquid epoxy, for example 1 part solid to 11 parts liquid, crosslinking of the epoxy resins with themselves will be promoted. Also, the epoxy to hydroxy ratio will be increased, which might make the epoxy-maleic anhydride reaction difficult to control and result in gel formation. It is essential to have a combined system, because all liquid epoxy would be too reactive with the maleic anhydride and catalyst, and would not provide a substantially uncrosslinked epoxy diester. The preferred ratio of solid epoxy: liquid epoxy is from 1:1 to 1:3.

In the examples, maleic anhydride is employed as the olefinically unsaturated dicarboxylic acid anhydride capable of complete reaction with the mixture of epoxy resins, to form a diester, which is capable of reaction with the addition-polymerizable monomer. It is essential that only maleic anhydride be used in the initial reaction with the epoxy resin mixture, since other anhydrides are not as reactive and may only provide half esters. It is critical that essentially all the maleic anhydride react with the epoxy resin mixture to form diesters, which are less reactive with styrene, so that little or no maleic anhydride is left to react subsequently with the added styrene.

The maleic anhydride is effective to completely react with the epoxy resins in this invention at concentrations of between about 0.01 part to 0.06 part, but preferably between about 0.03 part to 0.04 part, for each part of combined solid-liquid epoxy resin. Above 0.06 part and residual maleic anhydride may be left to react later with added styrene causing instability during storage. Also, the molecular weight of the epoxy diester would be increased to the extent that the final varnish would be too viscous for impregnation. Below 0.01 part and substantially complete reaction to form a diester may not occur, there would not be enough epoxy diester crosslinking sites to enable essentially complete styrene reaction, and as a result, the finally cured varnish would have inferior tensile and electrical properties.

The epoxy resin mixture and maleic anhydride must initially be reacted with between about 0.0001 part to 0.005 part, for each part of combined solid-liquid epoxy resin, of a catalyst selected from the group consisting of piperidine, pyridine, imidazoles selected, for example, from the group consisting of imidazole (unsubstituted); 1-methyl imidazole; 2-methyl imidazole; 2-ethyl imidazole; 2, 4, diethyl methyl imidazole; 2-methyl-1-vinyl imidazole; 1-vinyl imidazole; 2, 5-ethyl methyl imidazole and 2, 5-diethyl imidazole among others, where the structural chemical imidazole formula is shown below:

where R and R' can equal H, $CH_3$, $C_2H_5$, $C_6H_5$, $C_7H_7$, etc; and aliphatic tertiary amines selected, for example, from the group consisting of triethyl amine, tri-n-butyl amine, tri-n-propyl amine, tri-isopropyl amine and tri-isobutyl amine among other; and mixtures of these materials. These materials act as catalysts for the primary epoxy-maleic anhydride reaction. Below 0.0001 part and there will be insufficient reaction between the epoxy resins and the maleic anhydride, causing unreacted maleic anhydride to react with styrene and cause instability during storage, i.e., decrease pot life; above 0.005 part and the reaction becomes difficult to control, so that the mixture could gel due to epoxy resin crosslinking, i.e., epoxy-hydroxy reaction.

It is essential that the solid epoxy resin, liquid epoxy resin, maleic anhydride and catalyst, such as an aliphatic tertiary amine, be reacted in critical proportions as a first step in making the impregnating varnish of this invention. They must be reacted under such conditions that there is substantially complete reaction between the epoxy resins and the anhydride, and the epoxy diester formed has an acid number, indicating completeness of the epoxy-anhydride reaction, of between about 0.5 to 3.0. This is generally accomplished at a temperature of between about 80° C. to 100° C. for a period of time of from about 3 to 6 hours. Over about 6 hours at about 100° C. tends to promote unwanted crosslinking reactions and to increase the viscosity of the composition. The mixture may then be cooled for inclusion of the vinyl monomer and inhibitor, which may be added at a temperature of between about 50° C. to 90° C. to insure homogeneous mixture.

In the examples, styrene is used as the addition polymerizable monomer, and it is preferred because of its low cost and good dielectric and tensile properties on cure. There may also be used and substituted in the examples, however, such other liquid reactive monoethylenically unsaturated monomers which are free of functional groups reactive with the oxirane on the epoxy resin, such as vinyl toluene; alphamethyl styrene; 2, 4-dichloro styrene; paramethyl styrene; vinyl acetate; methyl methacrylate; ethyl acrylate; methyl vinyl ketone and butyl methacrylate, as well as mixtures of any two or more of these monomers.

The amount used of such monomer may be varied within rather wide limits, ranging on a weight basis from about 0.05 part to about 3 parts of monomer, but preferably about 0.5 part to 2 parts of monomer per 1 part of combined solid and liquid epoxy resin mixture. Increasing the proportion of vinyl monomer used tends to decrease the viscosity of the epoxy-resin composition. Dilution with such addition-polymerizable monomer may, however, be carried to the point where the desirable properties sought to be obtained by the use of an epoxy-resin-containing composition are substantially impaired or lost, and polystyrene can be formed in the system, which can reduce the tensile and electrical properties in the cured impregnating varnish. On the other hand, the use of at least an amount of such monomer effective to impart a short gel time to the composition is required in accordance with the concept of the instant invention.

The aromatic acidic compound that must be added in the second step with the styrene, as a room temperature stabilizer, is selected from the group consisting of dinitrophenols and trinitrophenols, such as, for example: 2, 4 dinitrophenol; 2, 6 dinitrophenol; di or tri nitroresorcinol etc., with picric acid (2, 4, 6-trinitrophenol) being preferred, and aromatic quinones, such as, for example, para-benzoquinone; 2, 5, -ditertiary butylhydroquinone; tertiary butylhydroquinone, catechol and cresylic acid; and mixtures thereof. These compounds function as a room temperature stabilizer for the particular epoxy diester-styrene composition described above. The effective range of stabilizer is between about 0.0003 part to 0.004 part for each part combined solid-liquid epoxy resin. Above 0.004 part causes the compound to act as an accelerator, which serves to protonate (add $H^+$) the epoxy groups, thereby promoting reaction with the subsequently added polycarboxylic anhydride at room temperature. This causes an increase in impregnating varnish viscosity with accompanying shortened useful pot life. Under 0.0003 part will allow the styrene to slowly crosslink, causing an unstable mixture which would gel over a short period of time. As can be seen, the mixture at this point comprises an inhibited, solventless, liquid, epoxy diester-styrene mixture. This mixture is composed of specific ingredients added in critical amounts. The viscosity at this point is between about 5 cps to 500 cps, but preferably 5 cps to 300 cps at 25° C.

After the epoxy resins, maleic anhydride, catalyst, styrene and stabilizer mentioned have been reacted, there are added, in accordance with the invention, one or more polycarboxylic acid anhydrides that are not reactive with styrene or other addition polymerizable monomers. These polycarboxylic acid anhydrides must be soluble in the inhibited, epoxy diester, styrene mixture at temperatures between about 0° C. to 35° C. The examples disclose the use of NMA (NADIC methyl anhydride), but other similar anhydrides may be used as well, such as, for example: a eutectic mixture of tetrahydrophthalic anhydride and hexahydrophthalic anhydride; dodecenyl succinic anhydride; trimellitic anhydride; 1-methyl tetrahydrophthalic anhydride; chlorodendic anhydride; benzophenone tetracarboxylic dianhydride; pyromellitic dianhydride; phthalic anhydride and 1-methyl hexahydrophthalic anhydride. These may be used singly or in combination. The substantial amount of anhydride that is added is usually limited to an amount effective to react with the other compounds present, as otherwise unreacted anhydride tends to volatilize in applications involving exposure to heat and the properties of the composition are impaired.

The amount of the polycarboxylic acid anhydride that can be effectively added is between the range of about 0.3 part to 1.2 part, with a preferred range of between about 0.5 part to 0.6 part, for each part of combined solid-liquid epoxy resin. Above 1.2 part causes excessive residue of anhydride in the cured varnish, with accompanying reduction in electrical properties. Below 0.3 part results in insufficient reaction of the epoxy groups in the diester, with resultant inferior tensile and electrical properties in the cured varnish.

In the examples, peroxide is used as a free-radical-type high temperature catalyst for the polymerization reaction. Useful catalysts of this type include the following high temperature catalytic peroxides: 2,5-dimethyl-2,5 bis(benzoylperoxy) hexane; benzoylperoxide; dicumylperoxide, lauroyl peroxide and methyl ethyl ketone peroxide and mixtures thereof. Azo compounds, having the structural formula R—N=N—R where R can be alkyl or aryl, can also be used as the high temperature free radical type catalyst. Useful azo compounds include: 2-(tert-butylazo) isobutryonitrile 2-tert-butylazo-2,4-dimethylpentane and perferably 1-tert-butylazo-1-phenylcyclohexane. The peroxide or azo catalyst or their mixtures must be effective to provide a catalytic effect to the impregnating varnish at temperatures over about 85° C. The effective range of high temperature peroxide or azo catalyst is between about 0.001 part to 0.01 part for each part of combined solid-liquid epoxy resin. Above 0.01 part shortens the storage lifetime of the impregnating varnish. Below 0.001 part causes very long gel times at the varnish curing temperature.

The polycarboxylic anhydride and peroxide catalyst are added separately or in combination to the inhibited, epoxy diester-styrene mixture, to provide an easily curable, solventless, liquid epoxy-styrene impregnating varnish having a viscosity of between about 5 cps to 500 cps at 25° C. The preferred viscosity range is between about 5 cps to 300 cps at 25° C. The polycarboxylic anhydride and peroxide or azo are added in a final step, at a temperature between about 0° C. to 35° C. to insure minimal reaction between the ingredients. The resultant epoxy-styrene impregnating varnish can be stored and remain stable for between about 45 days to 4 months at between 0° C. to 35° C. Upon heating to a temperature over about 85° C. but generally between about 120° C. to 145° C., the impregnating composition will cure to a thermoset resin. As described hereinabove, the selected metal acetylacetonate can be added with the styrene or as a last step with the polycarboxylic anhydride or peroxide or azo catalyst.

The resinous compositions of this invention may be mixed with suitable solid fillers which are not a catalyst for the epoxy diester-styrene mixture, such as hydrated alumina, and silica. These fillers preferably are used in finely divided form and may be used singly or in combination.

In the light of the examples hereinbelow, it will be obvious how to use the epoxy-resin compositions to produce a desired article. The articles can include potted or encapsulated electrical or electronic components, a laminated article based upon a material sufficiently heat-resistant to withstand the curing operation, such as polyethylene glycol terephthalate, in the form of fibrous sheets, as well as woven glass fiber, paper, cloth, asbestos or the like, or a casting. In all instances, excellent properties are obtained after baking at about 120° C. to 150° C. for about 4 hours to 12 hours.

As indicated heretofore, the epoxy-styrene solventless resin impregnating varnish of this invention has an atmospheric catalyzed pot life at 25° C. of at least 45 days. Pot life is defined by Lee and Neville in The *Handbook of Epoxy Resins*, as the time available for use of an epoxy system after the resin and curing agent are mixed. In applications requiring low viscosity, pot life generally ends at a viscosity of about 500 cps at processing temperatures, generally 25° C.

By a 45 day atmospheric catalyzed pot life, as described in this invention, is meant: that the epoxy diester-styrene-anhydride-free radical catalyst-selected metal acetylacetonate latent accelerator system of this invention will remain below 500 cps at 25° C. and will not form a semi-solid gel upon exposure to air at 25° C. or separate into a two phase system for at least 45 days. Air helps to inhibit the reaction of styrene with the diester, and it is believed that air also may react with the inhibitor to make the inhibitor more effective. The epoxy diester-styrene-anhydride system of this invention will remain useful as a low viscosity impregnant for at least 45 days, i.e., its viscosity will remain below 500 cps, generally below about 300 cps.

The epoxy diester-styrene reaction to a semi-solid gel is very fast; the system may remain, for example, at a viscosity of from 100 cps to 250 cps for 3 months, and then overnight proceed to a semi-solid gel, i.e., a system having a viscosity of over about 2,000,000 cps at 25° C. When it does gel, it may separate into an epoxy diester styrene and a polystyrene system. The test to be used in determining pot life in this invention is: the number of days required, for a sample of this system to pass 500 cps at 25° C. and proceed to form a semi-solid gel having a viscosity over about 2,000,000 cps at 25° C., when placed in a test tube, such as a standard Gardner-Holt bubble tube, open to air or stoppered with an air permeable cork, at 25° C. A termination point would also occur if the system would separate before it gelled.

In commercial practice, the varnish of this invention may be stored at about 5° C. to 10° C. in sealed vats to keep out moisture, in volumes of up to about 7,000 gallons, generally under nitrogen gas for safety. It may then be fed to impregnating tanks in an air environment and replenished as used. In such a low temperature storage replenishing operation, the pot life of this system could become infinite.

Figure 1:
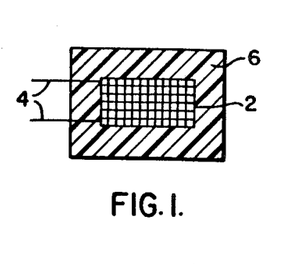
FIG. 1 shows an encapsulated electrical article made in accordance with the instant invention.

FIG. 1 shows an insulated electrical member such as a coil 2, which has leads 4, potted in a cured insulating casing 6, the casing being a resinous composition applied to the member. FIG. 1 is thus illustrative of certain articles of the invention, namely, electrical or electronic components potted or encapsulated in the epoxy-styrene-resin compositions of this invention.

Figure 2:
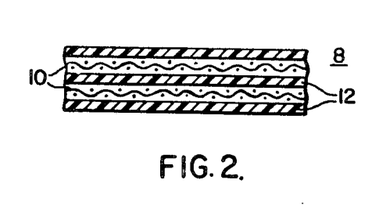
FIG. 2 shows a resinous laminate made in accordance with the instant invention.

FIG. 2 shows a laminate 8, made of individual plies 10 of resin impregnated and/or resin coated woven glass cloth. The laminate is bound into a unitary structure by the resin layer 12 of cured epoxy resin in accordance with the invention, and is thus illustrative of the laminated articles of the invention.

Figure 3:
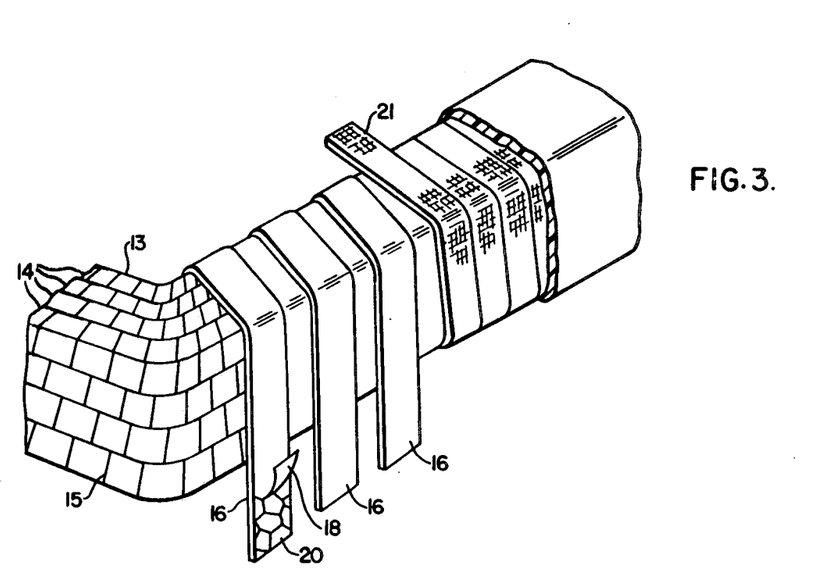
FIG. 3 shows a wrapped, resin-impregnated coil made in accordance with the instant invention.

The invention will now be described with particular reference to the preparation and impregnation of coils suitable for use in high-voltage electric motors and generators. The full coil would be disposed within the slots of the metal stator surrounding the metal motor armature or generator rotor. Referring to FIG. 3 of the drawings, there is illustrated a coil 13, comprising a plurality of turns of conductors 14. Each turn of the conductor 14 consists essentially of a copper bar or wire wrapped with turn insulation 15. The turn insulation 15 preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper asbestos cloth or asbestos paper treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage generator. Therefore, ground insulation for the coil is provided by wrapping one or more layers of composite mica tape 16 about the turn 14. Such composite tape 16 comprises a pliable backing sheet 18 of, for example, poly-ethylene glycol terephthalate mat, having a layer of mica flakes 20 bonded thereto by a liquid resinous binder. The tape may be applied half lapped, abutted or otherwise. Generally, a plurality of layers of the composite tape 16 are wrapped about the coil with sixteen or more layers generally being used for high voltage coils. To impart better abrasion resistance and to secure a tighter insulation, a wrapping of an outer tape 21 of a tough fibrous material, for example, glass fiber, asbestos or the like is applied to the coil.

Figure 4:
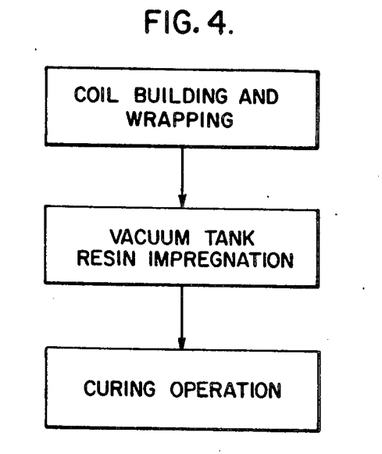
FIG. 4 is a flow sheet of the process for impregnating a coil.

In FIG. 4 of the drawings, there is a schematic illustration of the process steps which may be followed in preparing an insulated high voltage generator coil in accordance with this invention. The first step comprises the building and wrapping of a coil as described above. The coil so prepared then is introduced into a vacuum impregnating tank and may be subjected to a heat drying and evacuating operation to remove substantially all moisture, air and other undesirable volatile material from the coil. The polymerizable resinous composition of this invention is then introduced into the tank until the coil is completely submerged in the composition.

While the coil is completely covered with the polymerizable resinous composition, atmospheric air or a gas such as nitrogen or carbon dioxide is introduced into the impregnating tank under pressure to assist the polymerizable composition in penetrating completely into the interstices of the coil 13, and to assure substantially complete filling thereof. The impregnating treatment need not be of long duration. Ten minutes under pressure ordinarily is sufficient to completely impregnate and saturate small windings; longer impregnation periods, however, for example up to several hours or more, insure the most complete penetration and saturation of larger coils and windings. It will be understood that while vacuum impregnation produces the best results, ordinary immersions under atmospheric conditions will give good results.

The impregnated but uncured coil then is withdrawn from the impregnating tank, drained briefly and subjected to a curing operation. In some cases the coil is wrapped with an impervious tape to prevent escape or loss of the liquid composition therefrom during the curing operation. One preferred method of curing the polymerizable resinous composition comprises placing the impregnated coil in a sizing and curing press, provided with heating elements such as hot water pipes, electric heating members or the like. The polymerizable resinous composition may be cured on the coil while the same is in the mold by subjecting the same to heat to polymerize and cure the resin to a hard, insoluble and infusible solid. In other cases the wrapped coils can be put into an oven and cured by heating to temperatures above 85° C., for example, up to about 135° C. These coils, having a body of cured resinous insulation applied to the electrical windings making up the coil, can also be used in transformers where they are disposed about a magnetic core.

Figure 5:
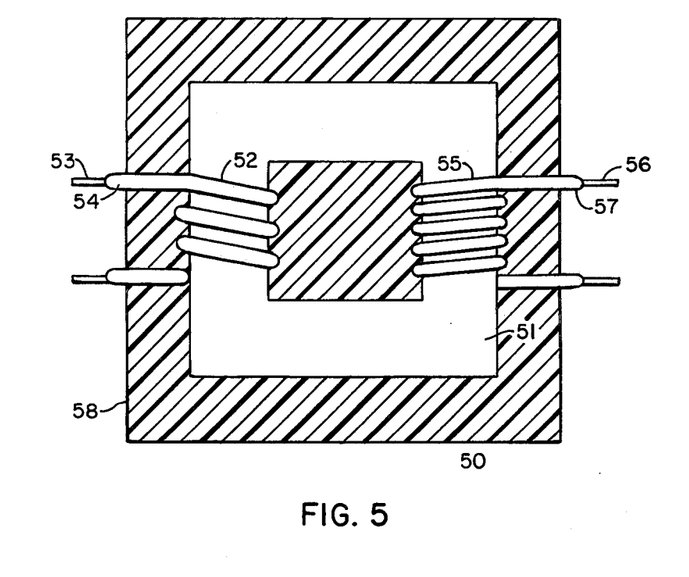
FIG. 5 is a cross sectional view of a transformer, potted with the composition of this invention.
Figure 6:
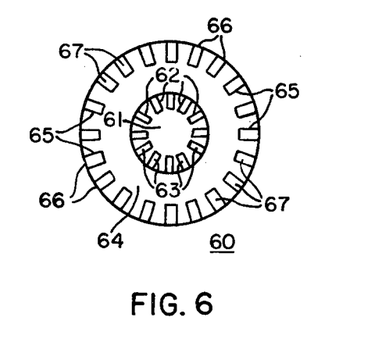
FIG. 6 is a cross sectional view of a motor, containing coils wound with mica tape impregnated with the composition of this invention.
Figure 7:
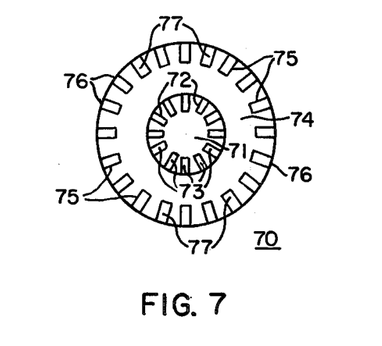
FIG. 7 is a cross sectional view of a generator, containing coils wound with mica tape impregnated with the composition of this invention.

FIG. 5 shows one embodiment of a transformer 50 in cross section. The transformer comprises a magnetic core 51 provided with one winding 52, which comprises an electrical conductor 53 insulated with insulation 54, and another winding 55, which comprises conductor 56 also insulated with insulation 57. The magnetic core with its associated windings disposed about the core may be potted with insulation 58. All of the insulation can comprise the cured resinous compositions of this invention. FIG. 6 shows one embodiment of a motor 60 in cross section. The motor comprises a metal armature 61 having slots 62 therein, containing insulated coils 63, surrounded by a metal stator 64 having slots 65 therein about the stator circumference at 66. The stator slots contain insulated coils 67. All the insulation on the coils 63 and 67 can comprise mica tape composites impregnated with the resinous compositions of this invention. FIG. 7 shows one embodiment of a generator 70 in cross section. The generator comprises a metal rotor 71 having slots 72 therein, containing insulated coils 73, surrounded by a metal stator 74 having slots 75 therein about the stator circumference at 76. The stator slots contain insulated coils 77 and may also contain inner cooling channels not shown. All the insulation on the coils 73 and 77 can comprise mica tape composites impregnated with the resinous compositions of this invention.

EXAMPLE 1

Epoxy-styrene-anhydride solventless resin impregnating varnish samples were prepared. A two component epoxy resin system was first made by mixing 3.25 parts of a solid low melting diglycidyl ether of bisphenol A, having an epoxy equivalent weight of about 475 to 575, a purity of about 99.5%, and a Durran's melting point of about 70° C. to 80° C. (sold commercially by Dow Chemical Company under the trade name DER-661) with 6.75 parts of a liquid diglycidyl ether of bisphenol A, having an epoxy equivalent weight of about 180 to 200 and a viscosity of between 10,000 cps to 16,000 cps at 25° C. (sold commercially by Jones-Dabney Company under the trade name Epi-Rez 510). The resins were well blended, and the ratio of solid epoxy to liquid epoxy was 1:2.1.

The resins were then heated to 90° C. Then, to the 10 parts of combined solid-liquid epoxy resin was added 0.375 part of maleic anhydride or about 99.5% purity and 0.004 part of benzyl dimethyl amine as a catalyst. The catalyzed epoxy-anhydride was held at 90° C. for about 6 hours, during which time it was occasionally stirred, to substantially completely react all of the maleic anhydride, and effect a reaction to the complete epoxy diester stage. The epoxy diester remained fluid, and did not gel. It is preferred to use high purity epoxy materials, since inclusion of impurities may upset the critical weight % balance and reaction mechanisms of these materials.

The acid number of the epoxy diester formed was about 2.5, indicating substantially complete reaction, i.e., about 0.1% maleic anhydride left unreacted. This value was determined by using the standard acid test, where 1 gram of the epoxy diester was dissolved in 25 grams of dioxane solvent in a flask. Two drops of phenol-phthalein indicator was added to color the solution, which was then titrated to the end point with 0.05 N potassium hydroxide. The % maleic anhydride left unreacted was also confirmed using infrared spectral measurements on a Perkin Elmer 700 Spectrophotometer using a smeared epoxy diester sample on NaCl plates.

produce a clear, rigid, cured thermoset resin. Each of the samples was also gelled in the form of a casting ⅛ inch thick, by being heated at 135° C. for 4 hours, and at a 150° C. final cure for another 8 hours, and tested for dielectric constant and 60 Hz. power factor values at 150° C. The results of the tests are shown below in Table 1.

TABLE 1

| No. | Metal Acetylacetonate | Gel Time 135° C. (min) | Storage Stability (days) 25° C. | Storage Stability (days) 40° C. | Power Factor (100 × tan δ) 150° C. | Dielectric Constant ε 150° C. |
|---|---|---|---|---|---|---|
| 1 | none (control) | 25-30 | 120+ | 13 | 198.0% | ** |
| 2 | chromium (III) | 25-30 | 120+ | 13 | 7.0% | 5.9 |
| 3 | manganese (III) | 25-30 | 120+ | 14 | 1.4% | 5.3 |
| 4 | ferric (iron (III) | 15-20 | 90 | 9 | 1.2% | 4.8 |
| 5 | zinc (II)* | 20-25 | — | 20+ | 3.4% | 4.4 |
| 6 | sodium (I) | 20-25 | — | 20+ | 11.0% | 4.4 |
| 7 | aluminum (III) | 20-25 | — | 20+ | 1.7% | 5.1 |
| 8 | uranyl (VI) | 15-20 | — | 20+ | 3.4% | 4.5 |
| 9 | manganese (II)* | 30-40 | — | 14 | 3.9% | 4.1 |
| 10 | cobalt (II) | 40-50 | 3 | 2 | 2.6% | 4.9 |
| 11 | cobalt (III) | 20-25 | 80 | 10 | 1.7% | 4.9 |
| 12 | titanium oxide* | 25-30 | 120+ | 25 | 43.0% | ** |

*50% solubility
**value too high to be measured
Samples 1 and 9-12 = comparative examples Nineteen parts of styrene vinyl monomer, to be used as a diluent, was mixed with 0.012 part para-benzoquinone to be used as a room temperature reacting inhibitor. The epoxy diester was allowed to cool to about 60° C., and then the styrene-para-benzoquinone mixture was added and stirred in. The inhibited liquid epoxy diesterstyrene mixture was allowed to cool to 25° C. and the viscosity was measured to be about 200 cps at 25° C.

To this inhibited epoxy diester-styrene mixture 5.49 parts of NADIC methyl anhydride and 0.048 part of 2,5-dimethyl-2,5 bis(benzoyl peroxy) hexane catalyst (sold by Wallace & Tiernan Inc. under the trade name of Luperox 118) were added, at 25° C., to provide the solventless epoxy-styrene impregnating varnish. The catalyst used has a catalytic reaction "kick off" temperature of about 115° C., i.e., it will have a definite catalytic effect to initiate a cure reaction at over about 115° C. The viscosity of the epoxy-styrene impregnating varnish was measured to be about 10 cps to 15 cps at 25° C. To this resin system 0.029 part of various metal acetylacetonates were added. One sample, containing no metal acetylacetonate was used as a control. The weight ratio of epoxy mixture: styrene: metal acetylacetonate was 1:1.9:0.0029. This varnish was prepared in 1 gallon laboratory batches and in 250 gallon large scale commercial batches.

Gel time of the samples was determined. Twenty gram samples were placed in a 2 inch diameter aluminum dish and heated at 135° C. in an oven. To curtail styrene monomer losses in the curing oven, a clock glass was placed over each sample. Storage properties as shown by the change in viscosity of the epoxy-styrene impregnating varnish were also measured, in air, by placing 10 gram samples in standard, Pyrex, Gardner-Holt thin walled bubble viscometers of about 10 milliter to 12 milliter volume, with a one milliter air gap. These were stored at 25° C. and 40° C., with intentional exposure to a high degree of fluorescent light irradiation. The tubes were lightly stoppered with an air porous cork which permitted a certain amount of air flow (ASTM #D154-56).

Each of the samples was placed in an aluminum cup and baked in an oven at about 135° C. for 8 hours to As can be seen, a short time, low temperature cure did not effectively crosslink the control sample enough to provide power factor or dielectric constant values suitable for use in high voltage electrical apparatus. The inclusion of acetylacetonates, in a all cases, improved final cure at low temperatures, providing lower power factor and dielectric constant values.

Of the acetylacetonates tested, titanium oxyacetylacetonate provided very poor electrical properties. Manganese (II) acetylacetonate and cobalt (II) acetylacetonate provided poor gel time values. Cobalt (II) acetylacetonate provided very poor storage stability values, apparently causing a catastrophic decomposition reaction with the peroxide catalyst and/or styrene. Cobalt (III) acetylacetonate provided unacceptable, very marginal storage stability values at room temperature. Ferric (III) acetylacetonate provided acceptable storage stability values at room temperatures, especially when coupled with outstanding gel time properties. Zinc (II) acetylacetonate gives good gel, storage and electrical properties in spite of its marginal solubility. The remaining Samples 2, 3, 6, 7 and 8 provided outstanding storage and electrical properties. Chromium acetylacetonate is preferred, having good overall properties, low cost and commercial availability.

The Sample No. 2 resin, with chromium (III) acetylacetonate was vacuum impregnated at about 45 psi into copper test bars taped with mica splitting tape containing about 6% uncured bisphenol A epoxy resin as an adhesive on a dacron polyester web backing material. The test bars were then cured in an oven at about 150° C. for about 8 hours, and showed high heat distortion temperatures, low polymerization shrinkage, excellent thermal stability and low power factor and resistivity. Due to the excellent impregnation properties and low viscosity, the insulated bars were easily and throughouly impregnated with the varnish.

EXAMPLE 2

Epoxy-styrene-anhydride solventless resin impregnating varnish samples were prepared as described in EXAMPLE 1, using the same methods and tested in the same manner as in Example 1, except that 10 parts of styrene vinyl monomer was used, 0.0063 part of parabenzoquinone inhibitor was used and 0.02 part of various metal acetylacetonates were used and compared to a control sample. The weight ratio of epoxy mixture: styrene: metal acetylacetonate was 1:1:0.002. The results of the tests are shown below in Table 2.

TABLE 2

| No. | Metal Acetylacetonate | Storage Stability (days) 25° C. | Storage Stability (days) 40° C. | Power Factor (100 × tan δ) 150° C. |
|---|---|---|---|---|
| 20 | none (control) | 37+ | 24 | 500.0 |
| 21 | chromium (III) | 37+ | 24 | 9.2% |
| 22 | manganese (II) | 37+ | 24 | 18.0% |
| 23 | cobalt (II) | 14— 4 | | 13.0% |
| 24 | cobalt (III) | 37+ | 11 | 4.5% |

As can be seen, manganese (II) acetylacetonate provided poor poor factor values at low styrene loading and both cobalt (II) acetylacetonate and cobalt (III) acetylacetonate had poor storage stability values at 40° C. This electrical data was for ⅛ inch castings cured at 135° C. for 4 hours and 150° C. for 8 hours.

The sample No. 21 resin, with chromium (III) acetylacetonate was vacuum impregnated at about 85 psi. into copper test bars taped with three layers of mica splitting tape 3.5 mil thick containing about 6% uncured cycloaliphatic epoxy resin, catalyzed with tetrabutyl titanate, as an adhesive on a dacron polyester web backing material 1.5 mil thick. Similarly, a control sample containing no acetylacetonate was vacuum impregnated into the partially loaded mica tape pre-preg as described above. The test bars were then cured in an oven at 135° C. for 4 hours, 150° C. for 8 hours and 160° C. for 8 hours. These samples were then tested for 60 Hz power factor values at 150° C. The results of the tests are shown below in Table 3:

TABLE 3

| Metal Acetylacetonate | 150° C. Power Factor (100 × tan δ) |
|---|---|
| none (control) | 33.5% |
| chromium (III) | 6.6% |

Power factor values below 15% at 150° C. are considered highly acceptable for 15 mil mica-cured resin composites for high voltage insulation applications. Sample No. 21 shows the usefulness of the resin systems of this invention as impregnants in plural wrapped mica tape for motor and generator coils.

We claim:

1. A resinous, solventless, low viscosity liquid impregnating composition having fast cure properties, comprising the admixture of:

(A) an epoxy diester, formed from the reaction of:
  (I) 1 part of a mixture of a solid 1,2-epoxy resin having an epoxy equivalent weight of between about 390 to 2,500, and a liquid 1,2-epoxy resin having an epoxy equivalent weight of between about 100 to 385, wherein the weight ratio of solid epoxy resin:- liquid epoxy resin is between about 1:1 to 1:10, with
  (II) between about 0.01 part to about 0.06 part of maleic anhydride and about 0.0001 part to about 0.005 part of a catalyst selected from the group consisting of piperidine, pyridine, imidazoles, and aliphatic tertiary amines, and mixtures thereof; to form an epoxy diester having an acid number between about 0.5 to 3.0; with (B) between about 0.05 part to about 3.0 parts of a vinyl monomer co-reactive with the epoxy diester; about 0.0003 part to about 0.004 part of a room temperature stabilizer selected from the group consisting of dinitrophenols, trinitrophenols, aromatic quinones, and mixtures thereof; between about 0.3 part to about 1.2 parts of a polycarboxylic anhydride which is soluble in the epoxy diester-vinyl monomer-stabilizer mixture at temperatures of between about 0° C. to 35° C.; and an amount of a free radical catalyst selected from the group consisting of azo compounds, peroxides, and mixtures thereof, that is effective to provide a catalytic curing effect on the mixture at a temperature of over about 85° C.; and (C) between 0.0005 part to 0.005 part of a metal acetylacetonate, selected from the group consisting of sodium (I) acetylacetonate, zinc (II) acetylacetonate, chromium (III) acetylacetonate, manganese (III) acetylacetonate, ferric (III) acetylacetonate, aluminum (III) acetylacetonate, uranyl (VI) acetylacetonate, and mixtures thereof, acting as the latent accelerator; to provide an epoxy-styrene solventless, liquid impregnating composition, having a viscosity of between about 5 cps to 500 cps at 25° C., and an atmospheric catalyzed pot life at 25° C. of at least 45 days.

2. The solventless impregnating composition of claim 1, wherein chromium (III) acetylacetonate is used as latent accelerator.

3. The solventless impregnating composition of claim 1, wherein the epoxy resins are diglycidyl ethers of bisphenol A, and the solid epoxy resin has an epoxy equivalent weight of between about 390–800.

4. The solventless impregnating composition of claim 1, wherein the catalyst added in (A) (II) is an aliphatic tertiary amine, the vinyl monomer is selected from the group consisting of styrene, vinyl toluene, alphamethyl styrene, 2,4-dichlorostyrene, paramethyl styrene, vinyl acetate, methyl metacrylate, ethyl acrylate, methyl vinyl ketone, butyl methacrylate, and mixtures thereof, and about 0.01 to 0.001 part of free radical catalyst added in (B) is used in the reaction.

5. The solventless impregnating composition of claim 4, wherein the room temperature stabilizer is selected from the group consisting of picric acid; 2,4 dinitrophenol; 2,6 dinitrophenol; dinitroresorcinol; trinitroresorcinol; para-benzoquinone; 2,5-ditertiary butylhydroquinone; tertiary butylhydroquinone; catechol; cresylic acid, and mixtures thereof; and the polycarboxylic anhydride which is mixed with the formed epoxy diester is selected from the group consisting of NADIC methyl anhydride, a eutectic mixture of tetrahydrophthalic anhydride and hexahydrophthalic anhydride, dodecenyl succinic anhydride, trimellitic anhydride, methyl tetrahydrophthalic anhydride, chlorendic anhydride, benzophenone tetracarboxylic dianhydride, pyromellitic dianhydride, phthalic anhydride, 1-methyl hexahydrophthalic anhydride, and mixtures thereof.

6. A resinous, solventless, low viscosity liquid impregnating composition having fast cure properties, useful for impregnating insulated electrical components, comprising the product of mixing:

(A) an epoxy diester, formed from the reaction of:
  (I) 1 part of a mixture of a solid 1,2-epoxy resin having an epoxy equivalent weight of between about 390 to 2,500 and a liquid 1,2-epoxy resin having an epoxy equivalent weight of between about 100 to 385, wherein the weight ratio of solid epoxy resin:- liquid epoxy resin is between about 1:1 to 1:10, with (II) between about 0.01 part to 0.06 part of maleic anhydride and about 0.0001 part to 0.005 part of an aliphatic tertiary amine catalyst, to form an epoxy diester having an acid number between about 0.5 to 3.0; with (B) between about 0.05 part to 3.0 parts of styrene, about 0.0003 part to 0.004 part of a room temperature stabilizer selected from the group consisting of dinitrophenols, trinitrophenols, aromatic quinones, and mixtures thereof; between about 0.3 part to 1.2 parts of a polycarboxylic anhydride which is soluble in the epoxy diester-styrene-stabilizer mixture at temperatures of between about 0° C. to 35° C.; and about 0.01 part to 0.001 part of peroxide catalyst that is effective to provide a catalytic curing effect on the mixture at a temperature of over 85° C.; and (C) between 0.0005 part to 0.005 part of chromium (III) acetylacetonate, acting as the latent accelerator to provide an epoxy-styrene solventless, liquid impregnating composition, having a vicosity of between about 5 cps to 500 cps at 25° C., and an atmospheric catalyzed pot life at 25° C. of at least 45 days.

7. The solventless impregnating composition of claim 6, wherein the epoxy resins are diglycidyl ethers of bisphenol A.

8. The solventless impregnating composition of claim 4, wherein the room temperature stabilizer is selected from the group consisting of picric acid; 2,4 dinitrophenol; 2,6 dinitrophenol; dinitroresorcinol; trinitroresorcinol; para-benzoquinone; 2,5-ditertiary butylhydroquinone; tertiary butylhydroquinone; catechol; cresylic acid, and mixtures thereof; and the polycarboxylic anhydride which is mixed with the formed epoxy diester is selected from the group consisting of NADIC methyl anhydride, a eutectic mixture of tetrahydrophthalic anhydride and hexahydrophthalic anhydride, dodecenyl succinic anhydride, trimellitic anhydride, methyl tetrahydrophthalic anhydride, chlorendic anhydride, benzophenone tetracarboxylic dianhydride, pyromellitic dianhydride, phthalic anhydride, 1-methyl hexahydrophthalic anhydride, and mixtures thereof.

* * * * *